United States Patent
Okada et al.

(10) Patent No.: US 9,906,685 B2
(45) Date of Patent: Feb. 27, 2018

(54) IMAGE SCANNING APPARATUS AND METHOD IMPLEMENTED IN THE SAME

(71) Applicant: BROTHER KOGYO KABUSHIKI KAISHA, Nagoya, Aichi (JP)

(72) Inventors: Hidekazu Okada, Hashima (JP); Takahiro Ikeno, Seto (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/461,547

(22) Filed: Mar. 17, 2017

(65) Prior Publication Data

US 2017/0280014 A1 Sep. 28, 2017

(30) Foreign Application Priority Data

Mar. 25, 2016 (JP) ................. 2016-061415

(51) Int. Cl.
| | |
|---|---|
| H04N 1/40 | (2006.01) |
| H04N 1/401 | (2006.01) |
| H04N 1/03 | (2006.01) |
| H04N 1/12 | (2006.01) |

(52) U.S. Cl.
CPC .............. *H04N 1/401* (2013.01); *H04N 1/03* (2013.01); *H04N 1/125* (2013.01); *H04N 2201/0081* (2013.01)

(58) Field of Classification Search
CPC .......... H04N 1/401; H04N 1/03; H04N 1/125; H04N 2201/0081
USPC ........................................ 358/461
See application file for complete search history.

(56) References Cited

U.S. PATENT DOCUMENTS

| | | | | |
|---|---|---|---|---|
| 2008/0252941 | A1* | 10/2008 | Hashizume | H04N 1/401 358/474 |
| 2010/0315687 | A1* | 12/2010 | Sakane | H04N 1/00002 358/461 |
| 2012/0113479 | A1 | 5/2012 | Sakai | |

FOREIGN PATENT DOCUMENTS

| | | |
|---|---|---|
| JP | H06-70162 A | 3/1994 |
| JP | 2001-094723 A | 4/2001 |
| JP | 2012-103291 A | 5/2012 |

* cited by examiner

*Primary Examiner* — Quang N Vo
(74) *Attorney, Agent, or Firm* — Scully, Scott, Murphy & Presser, PC

(57) ABSTRACT

An image scanning apparatus, comprising: a scanning device; a reference member; a correction unit; a controller; and a storage device, the scanning device comprising light receiving elements and a lens array, wherein the controller executes: a preparation process and an executive process, the preparation process comprising: a white reference data obtaining process to obtain white reference data by scanning a white reference original; and a white storing process to obtain white basic data by averaging the white reference data of a particular number of adjoining light receiving elements, wherein the executive process comprises: a reference member data obtaining process to obtain reference member data by scanning the reference member; a lens fluctuation calculation process to calculate fluctuation data of the correction data based on the reference member data; and a correction data generation process to generate the correction data by adding the fluctuation data to the white basic data.

16 Claims, 11 Drawing Sheets

IMAGE SCANNING APPARATUS AND METHOD IMPLEMENTED IN THE SAME

CROSS-REFERENCE TO RELATED APPLICATION

This application claims priority under 35 U.S.C. § 119 from Japanese Patent Application No. 2016-061415, filed on Mar. 25, 2016. The entire subject matter of the application is incorporated herein by reference.

BACKGROUND

Technical Field

Aspects of the present disclosures relate to an image scanning apparatus.

Related Art

An image scanning apparatus configured to store, in a non-volatile memory, white reference data obtained by scanning a white reference plate and to perform shading correction using the stored white reference data is known. In the image scanning apparatus, a contact type image sensor including a light source, a rod lens array and photoelectric conversion elements is used. It is known that, in such a contact type image sensor, larger amount of light is collected in a central portion of each single lens of the rod lens array and smaller amount of light is collected in a peripheral portion of each single lens of the rod lens array. In addition, in the contact type image sensor the position of the rod lens array and the position of the photoelectric conversion elements may shift with respect to each other due to a difference in expansion coefficient or a difference in fixing manner between a board mounting the photoelectric conversion elements and a board mounting the rod lens array.

The above described conventional image scanning apparatus is further configured to calculate, in regard to a particular number of photoelectric conversion elements disposed within an interval between adjacent lenses of the rod lens array, the maximum value and the minimum value of image data obtained by performing shading correction using the stored white reference data so as to decrease a scanning error due to the above described position shift. The image scanning apparatus determines the scanning start position being a pixel position at which the scanning is started so that the difference between the calculated maximum value and the minimum value obtained while shifting the scanning start position pixel by pixel is minimized.

SUMMARY

In the above described image scanning apparatus, an optimum scanning start position is determined by shifting pixel by pixel the scanning start position. Therefore, the potential position shift, which is less than a shift amount of one pixel, between the rod lens array and the photoelectric conversion elements may bring some difficulties to perform precise shading correction using the stored white reference data.

In consideration of the above, aspects of the disclosures provide an image scanning apparatus capable of performing precise shading correction using white reference data stored in advance in a non-volatile memory.

According to an aspect of the present disclosure, there is provided an image scanning apparatus, comprising: a scanning device configured to scan an original sheet; a reference member disposed to face the scanning device; a correction unit configured to execute shading correction for image data obtained by the scanning device based on correction data; a controller; and a storage device. The scanning device comprises: a light source; a plurality of light receiving elements arranged in one line; and a lens array having a plurality of lenses, the lens array being configured to converge light emitted by the light source onto the plurality of light receiving elements. The controller is configured to execute: a preparation process; and an executive process to be executed after execution of the preparation process. The preparation process comprises: a white reference data obtaining process in which the controller obtains white reference data for each of the plurality of light receiving elements in the one line by causing the scanning device to scan a white reference original sheet; and a white storing process in which the controller obtains white basic data by averaging, for each of the plurality of light receiving elements in the one line, the white reference data of a particular number of successively adjoining elements of the plurality of light receiving elements and stores the white basic data in the storage device. An interval spaced by the particular number of elements corresponds to an interval of the plurality of lenses of the lens array. The executive process comprises: a reference member data obtaining process in which the controller obtains reference member data for each of the plurality of light receiving elements in the one line by causing the scanning device to scan the reference member; a lens fluctuation calculation process in which the controller calculates, for each of the plurality of light receiving elements in the one line, fluctuation data of the correction data based on the reference member data; and a correction data generation process in which the controller generates, for each of the plurality of light receiving elements in the one line, the correction data by adding the fluctuation data to the white basic data.

BRIEF DESCRIPTION OF THE ACCOMPANYING DRAWINGS

FIG. 1 schematically illustrates an internal configuration of an image scanning apparatus according to an illustrative embodiment.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
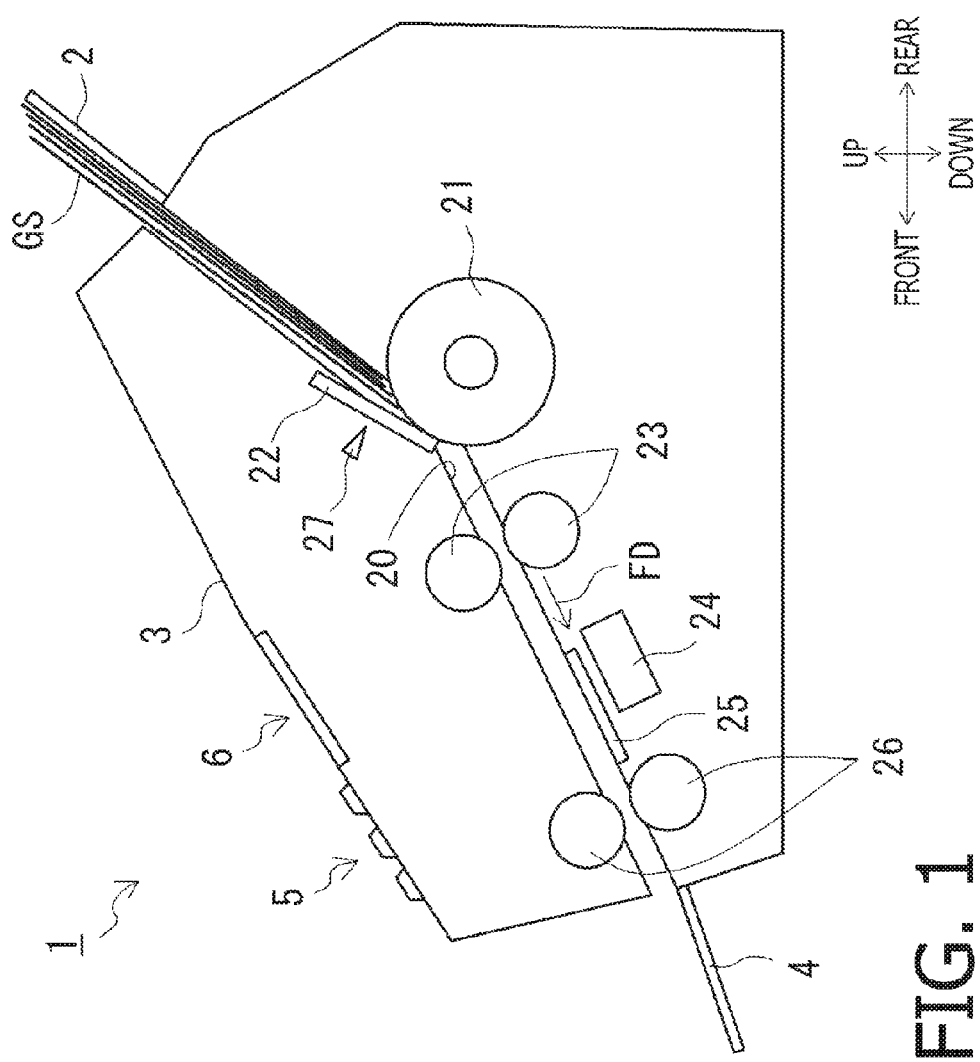

Hereafter, an image scanning apparatus 1 according to an illustrative embodiment is described with reference to the accompanying drawings. In FIG. 1, the up and down direction and the front and rear direction are indicated by two-headed arrows.

(Mechanical Configuration of Image Scanning Apparatus)

As shown in FIG. 1, the image scanning apparatus 1 includes a paper supply tray 2, a body unit 3 and a paper discharge tray 4. On an upper surface of the body unit 2, an operation unit 5 and a display unit 6 are disposed. The operation unit 5 includes a power switch and various setting buttons. For example, the operation unit 5 includes a start button for instructing start of the scanning operation, an operation button for setting resolution. The display unit 6 includes, for example, an LCD (Liquid Crystal Display) to display a status of the image scanning apparatus 1.

A conveying path 20 is formed in the inside of the body unit 3. An original sheet GS placed on the paper supply tray 2 is conveyed in a conveying direction FD along the conveying path 20, and is discharged to the paper discharge tray 4. Along the conveying path 20, a supply roller 21, a separation pad 22, a pair of upstream conveying rollers 23, a scanning device 24, a platen glass 25 and a pair of downstream conveying rollers 26 are disposed.

The supply roller 21 operates, in cooperation with the separation pad 22, to supply one by one a plurality of original sheets placed on the paper supply tray 2. The upstream conveying rollers 23 and the downstream conveying rollers 26 are driven by a conveying motor MT (see FIG. 4). The platen glass 25 has optical transparency, and is disposed on a lower side with respect to the conveying path 20 to be along the conveying path 20. The conveying rollers 23 and 26 convey the original sheet GS supplied from the paper supply roller 21 so as to let the original sheet GS pass an upper surface of the platen glass 25.

In this illustrative embodiment, the original sheet GS is placed on the paper supply tray 2 such that a scanning surface of the original sheet GS points to a placement surface of the paper supply tray 2. The scanning device 24 is disposed on a lower side with respect to the conveying path 20, and scans an image formed on the scanning surface of the original sheet GS passing through the platen glass 25. An original sensor 27 is disposed at the paper supply tray 2. The original sensor 27 turns on when the original sheet GS is placed on the paper supply tray 2, and turns off when no original sheet GS is placed on the paper supply tray 2.

(Detailed Configuration of Scanning Device)

Figure 2:
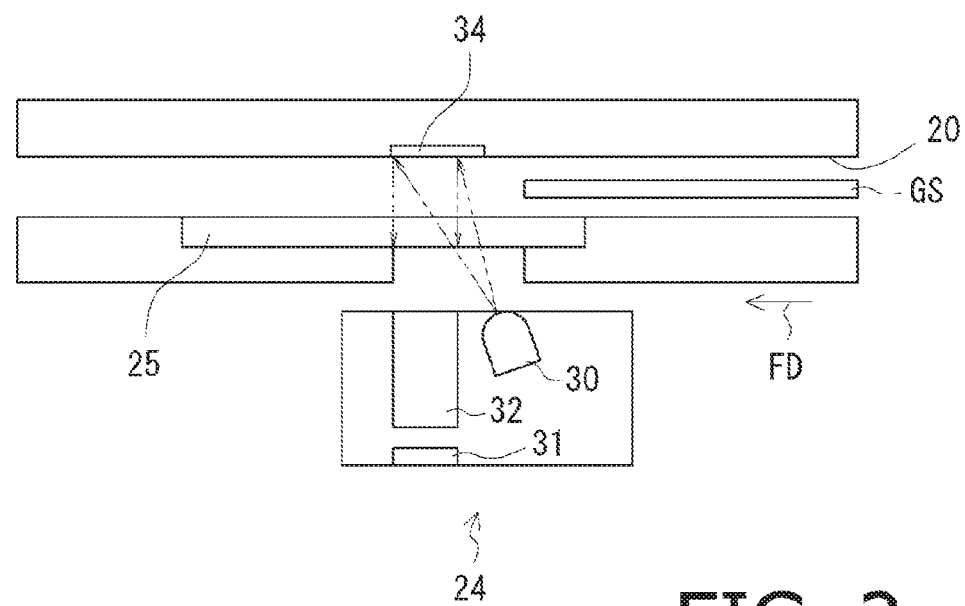
FIG. 2 is an enlarged view of a configuration of a scanning device in the image scanning apparatus.

The detailed configuration of the scanning device 24 will now be explained with reference to FIGS. 2 and 3. As shown in FIG. 2, the scanning device 24 includes a light source 30, a light receiving unit 31 and a rod lens array 32. The light source 30 includes three color light emitting diodes of red, green and blue. When light is reflected from the scanning surface of the original sheet GS, the rod lens array 32 converges the reflected light onto the light receiving unit 31. In this illustrative embodiment, in a state where a color mode is selected, a line of the image of the original sheet GS is scanned while causing the three color light emitting diodes to sequentially turn on. In a state where a monochrome mode is selected, a line of the image of the original sheet GS is scanned while one of the three colors diodes (e.g., a green color light emitting diode) is turned on. For example, the scanning device 24 is configured to be able to scan an image in resolution of 300 DPI with respect to an original sheet having A4 width being 210 mm (millimeter).

A gray reference plate 34 is disposed at a position facing the scanning device 24 via the conveying path 20. The gray reference plate 24 has reflectivity lower than that of white being a background color of the original sheet GS. When no original sheet GS exists on the conveying path 20, the light emitted from the light source 30 is reflected from the gray reference plate 34, and is received by the light receiving unit 31 via the rod lens array 32. The rod lens array 32 includes a plurality of rod lenses arranged in a main scanning direction MD. For example, intervals between the rod lenses of the rod lens array 32 are 0.4 mm. In this illustrative embodiment, the density of a gray color of the gray reference plate 34 is closer to the density of black color, and presents a lower reflection density than a reflection density of white color even when the light source 30 is activated at the maximum light amount.

Figure 3:
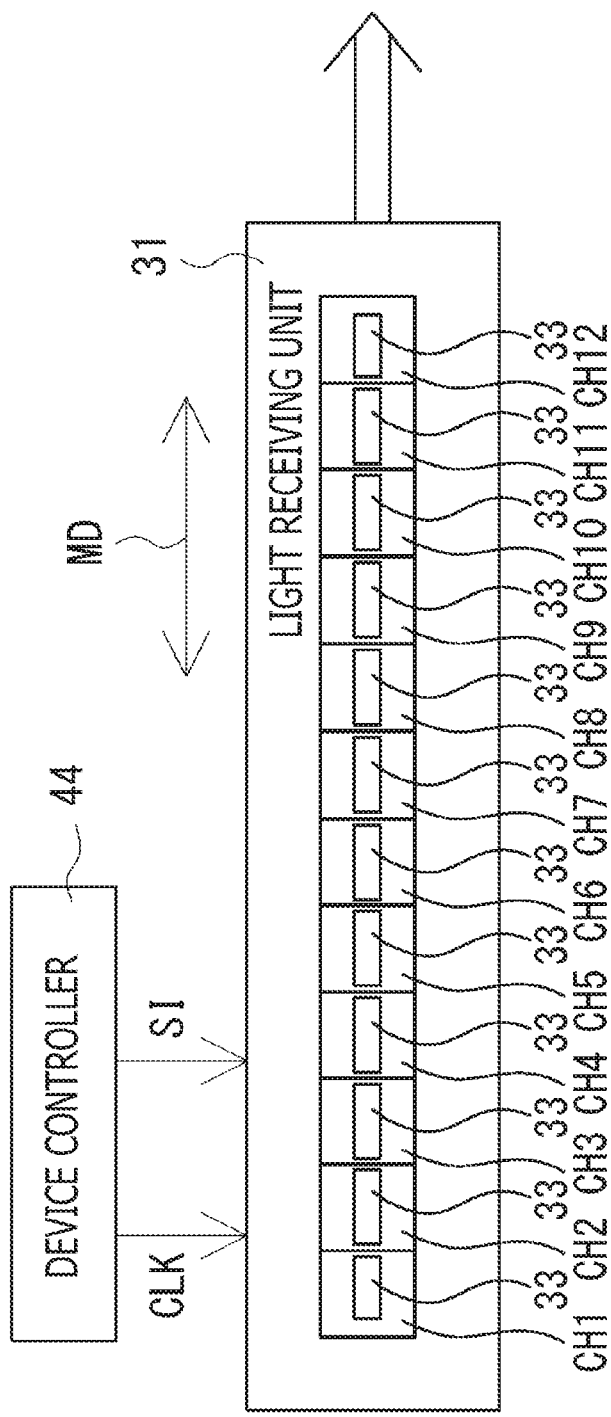
FIG. 3 is a block diagram illustrating a configuration of a light receiving unit of the scanning device.

In FIG. 3, the light receiving unit 31 includes sensor IC chips CH1 to CH 12 (hereafter, referred to as chips CH1 to CH12). Each of the chips CH1 to CH12 includes a plurality of photoelectric conversion elements 33 arranged in the main scanning direction MD. Each of the chips CH1 to CH12 further includes therein a shift register and an amplifier (not shown). In each of the photoelectric conversion elements 33, charges corresponding to a received light amount are accumulated, and the accumulated charges of each photoelectric conversion element 33 are output as an analog signal of each pixel. A pixel located, on the chip CH1 disposed on the most upstream side in the main scanning direction MD, at one end not adjoining the other chips CH2 to CH12 is defined as a top pixel. A pixel located, on the chip CH 12 disposed on the most downstream side in the main scanning direction MD, at one end not adjoining the other chips CH1 to CH11 is defined as a last chip. Since each of the chips CH1 to CH12 includes 216 photoelectric conversion elements 33, the total number of the photoelectric conversion elements 33 is 2592. The pixel number PN of the top pixel is 1, and the pixel number PN of the last pixel is 2592. In this illustrative embodiment, each of the chips CH1 to CH12 has the same output characteristics regarding pixels provided therein. However, the output characteristics of pixels between the chips CH1 to CH12 may vary. The term one line means a pixel group constituted by the pixels from the top pixel to the last pixel.

(Electric Configuration of Image Scanning Apparatus)

Figure 4:
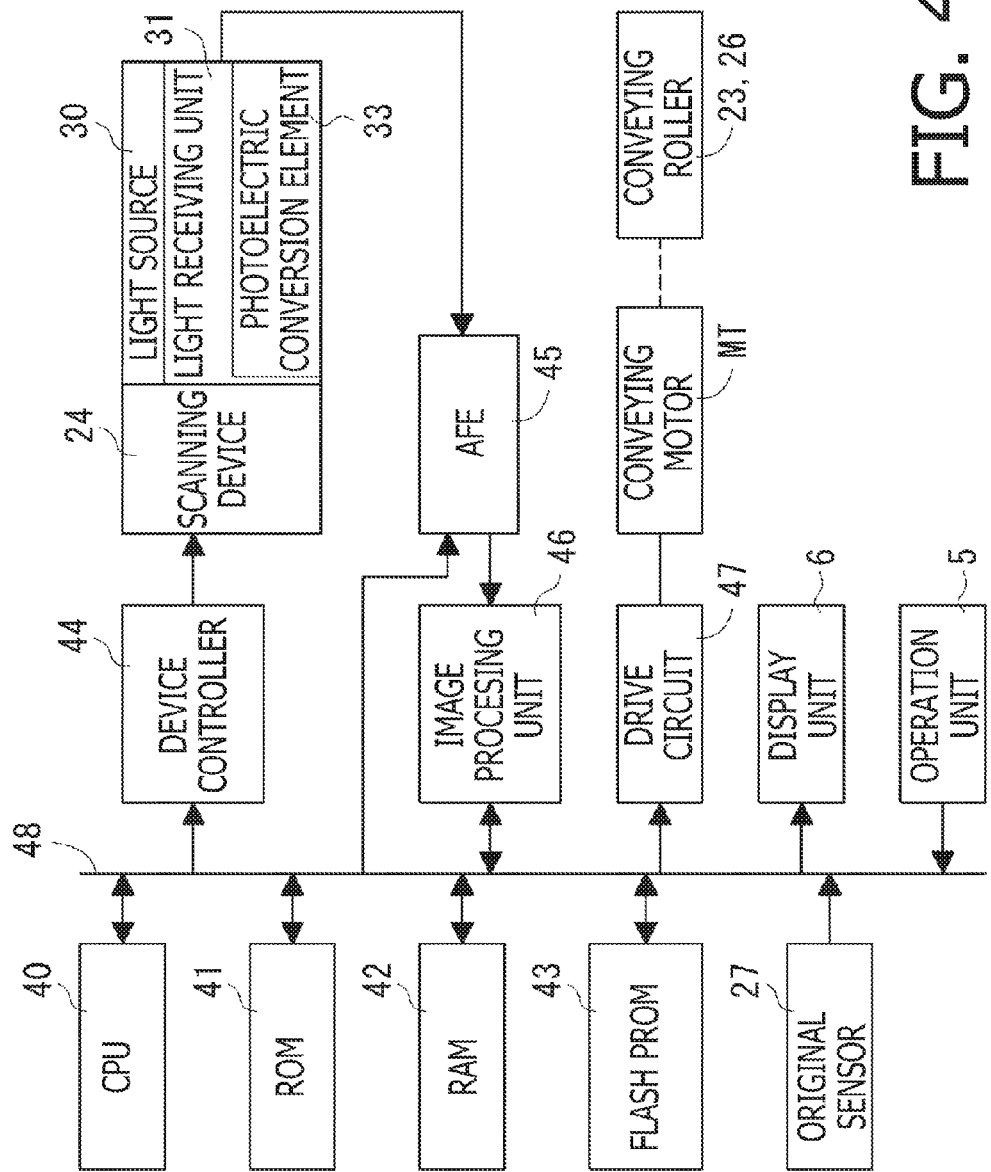
FIG. 4 is a block diagram illustrating an electric configuration of the image scanning apparatus.

An electric configuration of the image scanning apparatus 1 will now be explained with reference to FIG. 4. As shown in FIG. 4, the image scanning apparatus 1 includes, as principal components, a CPU 40, a ROM 41, a RAM 42, a flash PROM 43, a device controller 44, an analog front end (hereafter, abbreviated as AFE) 45, an image processing unit 46, and a drive circuit 47. These components are connected to the operation unit 5, the display unit 6 and the original sensor 27 via a bus 48.

The ROM 41 stores programs for executing various processes of the image scanning apparatus 1. The programs may include, but not be limited to, a maintenance main process, a scanning main process, and processes for subroutines of each main process. The CPU 40 controls the respective units and components in accordance with programs read from the ROM 41. The flash PROM 43 is a nonvolatile memory which is readable and writable, and stores various types of data, such as data generated during a control process and data calculated in the maintenance main process. The RAM 42 temporarily stores data, such as calculation results generated by the control process by the CPU 40.

The device controller 44 is connected to the scanning device 24. In accordance with instructions from the CPU 40, the device controller 44 transmits, to the light source 30, a signal for controlling on or off of the light source 30 and a signal for controlling a current value flowing through the light source 30. Further, as shown in FIG. 3, the device controller 44 transmits, to the light receiving unit 31, a serial-in signal SI for transferring electric signals of the plurality of photoelectric conversion elements 33 to the shift register, and a clock signal CLK for sequentially outputting the electric signals from the shift register. When the scanning device 24 receives these control signals from the device controller 44, the scanning device 24 turns on the light source 30, and transmits, to the AFE 45, an analog signal corresponding to the light amount received by the light receiving unit 31. The maximum light amount which the light source 30 outputs is defined by a maximum current preliminary set, and a maximum time period for which the light source 30 can be turned on within intervals of the serial-in signal SI.

The AFE 45 is connected to the scanning device 24. In accordance with instructions from the CPU 40, the AFE 45 converts the analog signal transmitted from the scanning device 24 into digital data. The AFE 45 has an input range and resolution preliminary set. For example, the resolution defined as 10 bit corresponds to "0" to "1023" gray scales. In this case, the AFE 45 converts the analog signal transmitted from the scanning device 24 into 10 bit gray scale data (0 to 1023). The digital data converted by the AFE 45 is then transmitted to the image processing unit 46. In the AFE 45, an offset adjustment value indicating an offset adjustment amount for offset-adjusting the analog signal transmitted from the scanning device 24, and a gain adjustment value indicating a gain adjustment amount for gain-adjusting the analog signal which has been offset-adjusted are set. The AFE 45 converts the offset-adjusted and gain-adjusted analog signal into digital data.

The image processing unit 46 is constituted by an ASIC (an Application Specific Integrated Circuit) which is an exclusive IC, and is configured to execute various types of image processing. The image processing includes a shading correction and a gamma correction. The image processing unit 46 may be set not to execute the various image processing or may be set to execute all the various image processing. The image processing unit 46 subjects the digital data to the set image processing to generate digital image data. The digital image data is stored in the RAM 42 via the bus 48. The shading correction is, for example, white correction and black correction. In the image processing unit 46, black correction data is set for the back correction, and white correction data is set for the white correction. For example, when the image processing unit 46 is set to execute the shading correction and not to execute the gamma correction, the image processing unit 46 subjects the digital data to the back correction in accordance with the set black correction data, and subjects the digital data, which has been subjected to the black correction, to the white correction so as to generate the digital image data.

The drive circuit 47 is connected to the conveying motor 47, and drives the conveying motor MT in accordance with drive instructions transmitted from the CPU 40. The drive circuit 47 rotates the conveying motor MT in accordance with the rotation amount and the rotation direction instructed by the drive instructions. When the conveying motor MT rotates by a particular amount, the conveying rollers 23 and 26 rotate by a particular amount, and thereby the original sheet GS is conveyed by a particular distance along the conveying path 20.

(Operation in 1st Illustrative Embodiment)

Hereafter, operation of the image scanning apparatus 1 according to a 1st illustrative embodiment is described. The image scanning apparatus 1 executes the maintenance main process before scanning the original sheet GS, and executes the scanning main process for scanning the original sheet GS. Processes M1 to M12 in the maintenance main process and processes R1 to R8 in the scanning main process and the subroutines are executed under control of the CPU 40. In this illustrative embodiment, data processing which the CPU 40 executes for each pixel in one line is executed for each pixel of each of three colors in a color mode, and is executed for each pixel of a particular color in a monochrome mode. In this illustrative embodiment, explanation is given regarding the color mode.

(Maintenance Main Process)

Figure 5:
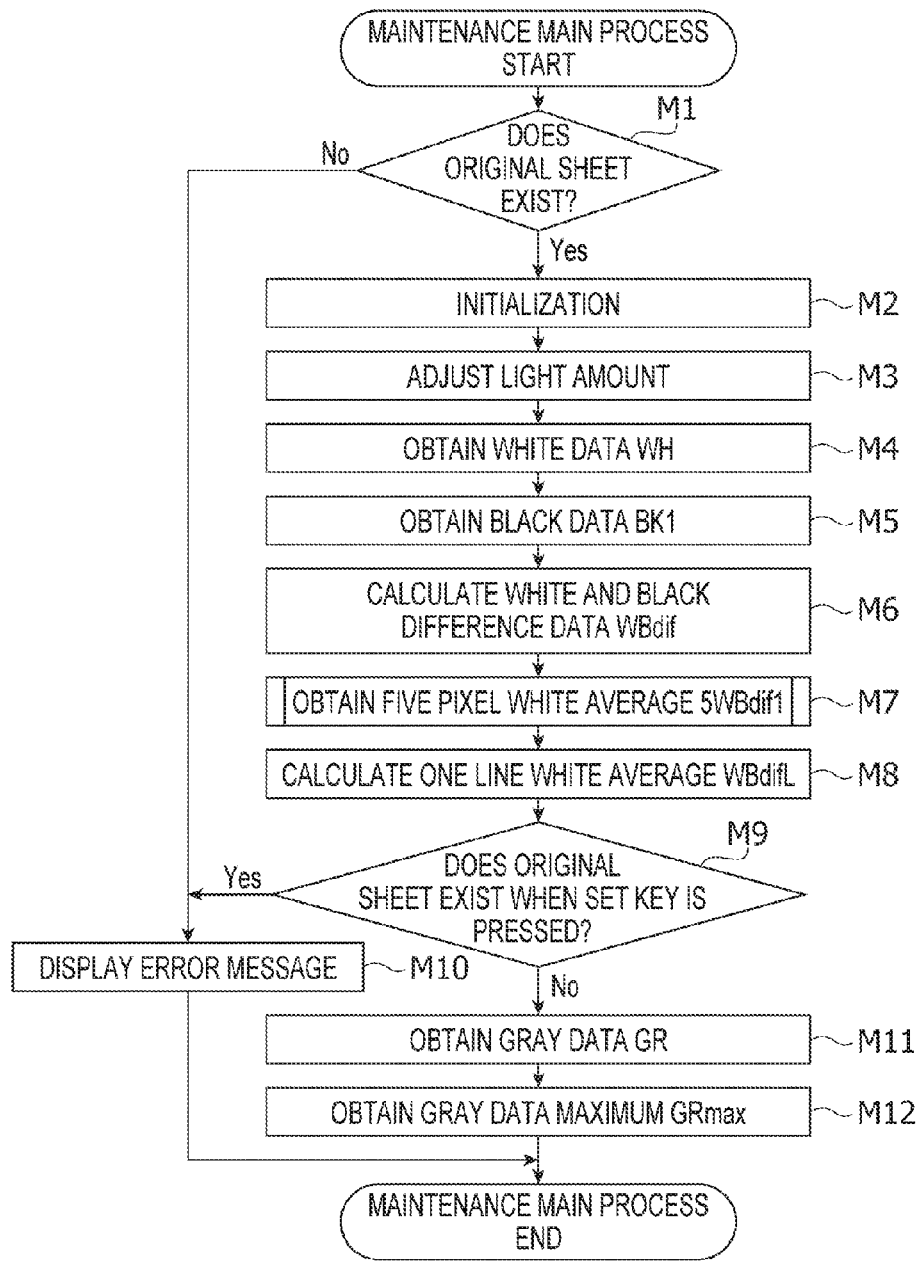
FIG. 5 is a flowchart illustrating a maintenance main process according to the illustrative embodiment.

The maintenance main process shown in FIG. 5 may be executed when an operator operates the operation unit 5 of the image scanning apparatus 1 in accordance with a particular operation manner at a factory before delivering the image scanning apparatus 1 to a customer or at a customer's location of the image scanning apparatus 1.

First, when a white reference original sheet WGS being a white reference is placed on the paper supply tray 2, the original sensor 27 detects the white reference original sheet WGS. The CPU 40 determines whether the white reference original sheet WGS exists in accordance with a detection signal from the original sensor 27 (M1). Specifically, the CPU 40 determines that the white reference original sheet WGS exists when the original sensor 27 is ON (M1: Yes), and then the process proceeds to the process M2. When the original sensor 27 is OFF, the CPU 40 determines that the white reference original sheet WGS does not exist (M1: No), and then the process proceeds to process M10. In the process M10, the CPU 40 displays, on the display unit 6, an error message indicating that a placement status of the original sheet GS is incorrect, and the maintenance main process is ended.

In process M2, the CPU 40 causes the drive circuit 47 to convey the white reference original sheet WGS to the platen glass 25, and initializes the device controller 44, the AFE 45 and the image processing unit 46. Specifically, the CPU 40 transmits a drive instruction to the drive circuit 47 to supply the white reference original sheet WGS placed on the paper supply tray 2 to the platen glass 25. Further, the CPU 40 obtains, from the flash PROM 43, settings regarding the clock signal CLK and the serial-in signal SI corresponding to the scanning resolution of 300 DPI to set the device controller 44. The CPU 40 obtains, from the flash PROM 43, settings regarding a signal to the light source 30 corresponding to the color mode, and sets the device controller 44. The CPU 40 obtains, from the flash PROM 43, the offset adjustment value and the gain adjustment value for the AFE

45, and sets them to the AFE 45. The CPU 40 sets the image processing unit 46 not to execute the various image processing.

The CPU 40 adjusts the light amount of the light source 30 (M3). Specifically, the CPU 40 causes the light source 30 to emit light to the white reference original sheet WGS, and adjusts the light amount ST of each color so that the analog signal obtained when the reflection light from the white reference original sheet WGS is scanned is the maximum within the input range of the AFE 45. It is noted that the light amount ST is determined by the lighting time and the current value for each color in one line of the light source 30. Each color is red, blue or green used in the color mode.

The CPU 40 obtains white data WH (M4). Specifically, the CPU 40 causes the light source 30 to turn on in the light amount ST, and scans the white reference original sheet WGS with the scanning device 24. Then, the CPU 40 obtains, as the white data WH, the digital image data of each pixel on the scanned one line.

The CPU 40 obtains black data BK1 (M5). Specifically, the CPU 40 causes the light source 30 to turn off, and scans the white reference original sheet WGS with the scanning device 24. Then, the CPU 40 obtains, as the black data BK1, the digital image data of each pixel of one color of the scanned one line. In this case, the one color corresponds to a dark color in a state where the light source 30 is turned off.

The CPU 40 obtains white and black difference data WBdif (M6). Specifically, the CPU 40 subtracts the black data BK1 from the white data WH for each pixel of each color in one line, and stores the subtraction result, as the white and black difference data WBdif of each pixel of each color in the one line, in the RAM 42.

The CPU 40 obtains five pixel white average 5WBdif1 (M7). Details about the five pixel white average 5WBdif1 are explained later. Here, the five pixel white average 5WBdif1 is briefly explained. The CPU 40 calculates the five pixel white average 5WBdif1 by averaging the white and black difference data WBdif of successively adjoining five pixels for each pixel of each color in one line. The CPU 40 stores, in the flash PROM 43, the calculated five pixel white average 5WBdif1 for each pixel of each color in one line. In this illustrative embodiment, the five pixel white average 5WBdif1 is calculated using five pixels successively adjoining from each pixel in one line. Each lens of the rod lens array 32 is arranged every 0.4 mm Each photoelectric conversion element 33 is arranged in a manner of 300 DPI, i.e., three-hundred (300) elements per inch. Therefore, each lens of the rod lens array 32 would pass light toward approximately 4.72 elements, i.e., 4.72 pixels. In this illustrative embodiment, based on the fact that an integer nearest to 4.72 is 5, the five pixel white average 5WBdif1 is calculated using the white and black difference data of successive adjoining five pixels. From the same reason, five successively adjoining pixels are used in each of process MA3, process MA4, process MB3, process MB4, process RA3, process RB3, process RB4, process RC5 and process RC6. By averaging the white and black difference data of five pixels or light gray and black difference data LGBdif of five pixels, influence of lens ripples caused by the rod lens array 32 may be removed.

The CPU 40 calculates one line white average WBdifL (M8). Specifically, the CPU 40 averages the white and black difference data WBdif of all the pixels in one line to calculate the one line white average WBdifL. The CPU 40 stores the calculated one line white average WBdifL in the flash PROM 43.

After the process M8 is finished, the CPU 40 causes the image scanning apparatus 1 to stay in a standby state until a set key disposed on the operation unit 5 is pressed (M9). When a worker removes the white reference original sheet WGS and presses the set key, the CPU 40 determines whether the original sensor 27 is in an off state. The CPU 40 determines that the white reference original sheet WGS does not exist when the original sensor 27 is in the off state (M9: No), and the process proceeds to process M11. The CPU 40 determines that the white reference original sheet WGS exists when the original sensor 27 is in the on state (M9: Yes), and the process proceeds to process M10. In the process M10, the CPU 40 causes the display unit 6 to display an error message indicating a placement state of the original sheet GS is incorrect. Then, the maintenance main process is ended.

In the process M11, the CPU 40 obtains gray data GR. Specifically, the CPU 40 illuminates a gray reference plate 34 with the light amount ST of each color, and obtains, as the gray data GR, the digital image data of each pixel of each color on one line scanned by the scanning device 24.

In the process M12, the CPU 40 obtains gray data maximum GRmax. Specifically, the CPU 40 obtains, as the gray data maximum GRmax, the maximum value of all the gray data GR of the pixels of each color in one line obtained in the process M11. The CPU 40 stores, in the flash PROM 43, the gray data maximum GRmax of each color while associating the gray data maximum GRmax with the corresponding color. After the process M11 is finished, the maintenance main process is ended.

(Five Pixel White Average 5WBdif1 Obtaining Process M7)

Figure 6:
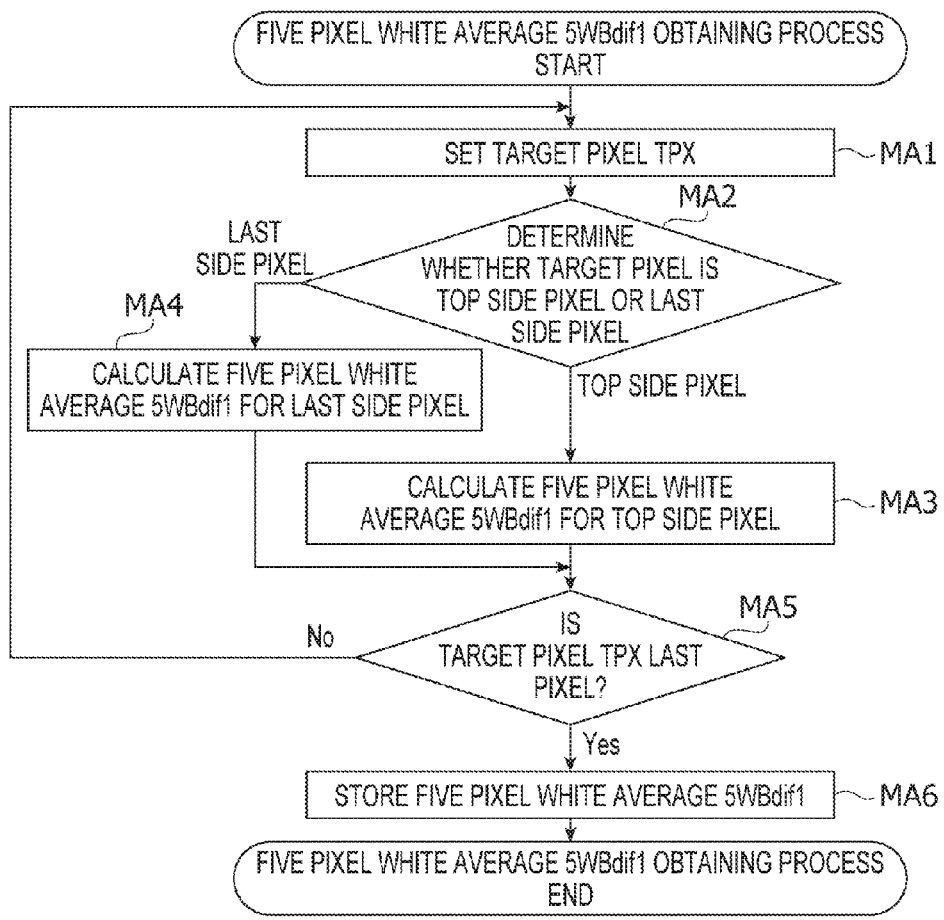
FIG. 6 is a flowchart illustrating a five pixel white average 5WBdif1 obtaining process according to the illustrative embodiment.

When the five pixel white average 5WBdif1 obtaining process (M7) shown in FIG. 6 is started, the CPU 40 sets a target pixel TPX (MA1). Specifically, when the target pixel TPX has already been set, the CPU 40 newly sets, as a new target pixel TPX, a pixel next to the already set target pixel TPX. When no target pixel has been set, the CPU 40 sets the top pixel as the target pixel TPX. By counting the number of pixels set as the target pixels, the CPU 40 obtains the pixel number PN of each target pixel and stores the pixel number PN in the RAM 42.

Next, in process MA2, the CPU 40 determines whether the target pixel TPX is a top side pixel or a last side pixel. Specifically, when the pixel number PN of the target pixel TPX is smaller than or equal to 1296 being a half of the pixel number PN of the last pixel in one line, the CPU 40 determines that the target pixel TPX is the top side pixel in one line (MA2: Top Side Pixel) and the process proceeds to process M3. When the pixel number PN of the target pixel TPX is larger than 1296, the CPU 40 determines that the target pixel TPX is the last side pixel in one line (MA2: Last Side Pixel), and the process proceeds to process MA4.

In process MA3, the CPU 40 calculates the five pixel white average 5WBdif1 in the top side pixels. Specifically, the CPU 40 obtains the five pixel white average 5WBdif1 of the target pixel TPX by averaging the white and black difference data WBdif of five pixels in total including the white and black difference data WBdif of the target pixel TPX and the white and black difference data WBdif of four pixels successively adjoining the target pixel TPX toward the last pixel side. Then, the process proceeds to process MA5.

In the process MA4, the CPU 40 calculates the five pixel white average 5WBdif1 in the last side pixels. Specifically, the CPU 40 obtains the five pixel white average 5WBdif1 of the target pixel TPX by averaging the white and black difference data WBdif of five pixels in total including the white and black difference data WBdif of the target pixel TPX and the white and black difference data WBdif of four pixels successively adjoining the target pixel TPX toward the top pixel side.

In the process MA5, the CPU 40 determines whether the target pixel TPX is the last pixel. Specifically, the CPU 40 determines whether the pixel number PN of the target pixel TPX is equal to 2592 which is the pixel number PN of the last pixel. When the pixel number PN of the target pixel TPX is not 2592, the CPU 40 determines that the target pixel TPX is not the last pixel (MA5: No), and then the process returns to the process MA1. When the pixel number PN of the target pixel TPX is 2592, the CPU 40 determines that the target pixel TPX is the last pixel (MA5: Yes) and deletes the setting of the target pixel TPX. Then, the process proceeds to process MA6.

In the process MA6, the CPU 40 stores the five pixel white average 5WBdif1. Specifically, the CPU 40 stores the five pixel white average 5WBdif1 calculated in the processes MA3 and MA4 in the flash PROM 43 as the five pixel white average 5WBdif1 for each pixel of each color in one line. After process MA6 is finished, the five pixel white average 5WBdif1 obtaining process (M7) is ended.

(Scanning Main Process)

Figure 7:
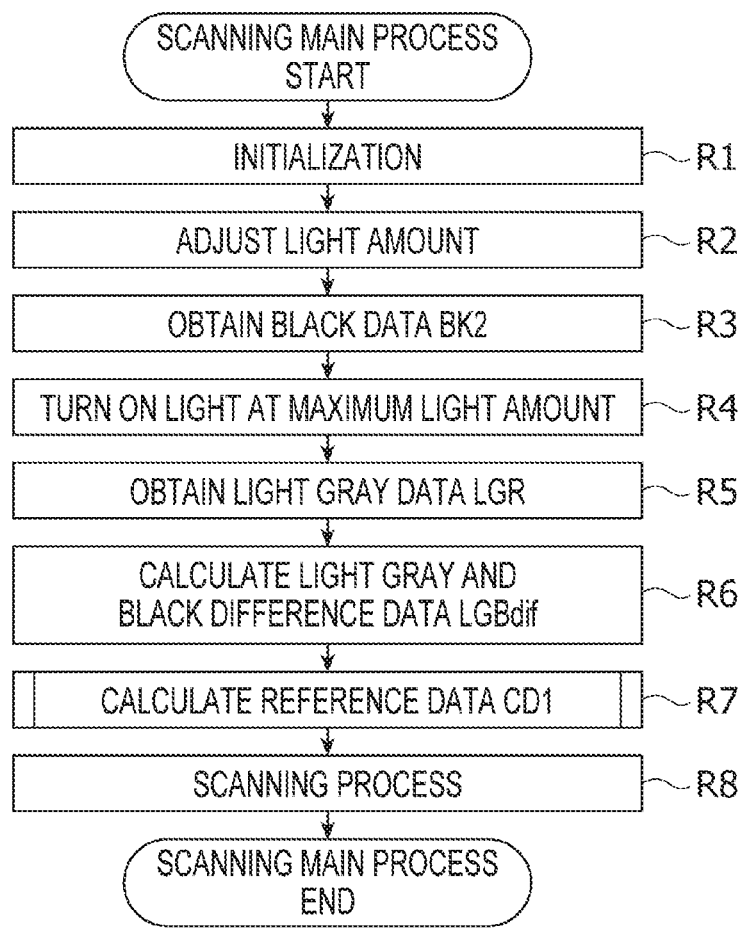
FIG. 7 is a flowchart illustrating a scanning main process according to the illustrative embodiment.

The scanning main process shown in FIG. 7 is started when a user place the original sheet GS on the paper supply tray 2 and presses a color scanning start button provided on the operation unit 5. In the following, the scanning main process is explained in regard to the case where the color mode is designated.

The CPU 40 initializes the device controller 44, the AFE 45 and the image processing unit 46 (R1). Specifically, the CPU 40 obtains, from the flash PROM 43, settings of the clock signal CLK and the serial-in signal SI corresponding to the scanning resolution of 300 DPI, and sets the obtained settings to the device controller 44. The CPU 40 obtains, from the flash PROM 43, settings in the color mode for a signal to the light source 30, and sets the obtained settings to the device controller 44. The CPU 40 obtains, from the flash PROM 43, the offset adjustment value and the gain adjustment value for the AFE 45, and sets the obtained settings to the AFE 45. The CPU 40 sets the image processing unit 46 not to execute the various image processing.

In process R2, the CPU 40 adjusts the light amount of the light source 30. Specifically, the CPU 40 causes the light source 30 to emit light to the gray reference plate 34, and adjusts the light amount ST of each color so that the maximum value of the digital image data when the reflection light from the gray reference plate 34 is scanned is the gray data maximum GRmax.

In process R3, the CPU 40 obtains black data BK2. Specifically, the CPU 40 causes the light source 30 to turn off, and causes the scanning device 24 to scan the gray reference plate 34. The CPU 40 obtains, as the black data BK2, the digital image data of each pixel of one color in the scanned one line.

In process R4, the CPU 40 turns on the light source 30 at the maximum light amount. Specifically, the CPU 40 turns on the light source 30 at the maximum current preliminary set for each color and in the maximum lighting period for the scanning resolution of 300 DPI.

In process R5, the CPU 40 obtains light gray data LGR. Specifically, the CPU 40 illuminates the gray reference plate 34 in a state where the light source 30 is turned on at the maximum light amount for each color, and obtains, as the light gray data LGR, the digital image data for each pixel of each color in the scanned one line.

In process R6, the CPU 40 calculates light gray and black difference data LGBdif. Specifically, the CPU 40 subtracts the black data BK2 from the light gray data LGR of each pixel of each color in the scanned one line to obtain the light gray and black difference data LGBdif of each pixel of each color in the one line.

In process R7, the CPU 40 calculates reference data CD1. Details about the calculation of the reference data CD1 are described later. Here, the calculation of the reference data CD1 is briefly explained. The CPU 40 calculates one line gray average LGBdifL. The CPU 40 calculates, as an average ratio AVRT, the ratio between the one line white average WBdifL and the one line gray average LGBdifL. The CPU 40 calculates, for each pixel in one line, the five pixel gray average 5LGBdif1 by averaging the light gray and black difference data LGBdif of successively adjoining five pixels in one line. The CPU 40 calculates ripple data RD1 based on the light gray and black difference data LGBdif, the five pixel gray average 5LGBdif1, and the average ratio AVRT. The CPU 40 calculates the reference data CD1 based on the ripple data RD1 and the five pixel white average 5WBdif1.

In process R8, the CPU 40 executes a scanning process. Specifically, the CPU 40 sets the image processing unit 46 to execute the various image processing. The CPU 40 outputs instructions to the drive circuit 47 to cause the drive circuit 47 to convey the original sheet GS. The CPU 40 causes the scanning device 24 to scan the original sheet GS, and executes shading correction for each color while using the reference data CD1 calculated in the process R7 as the white correction data, and further executes the various correction processes to generate the digital image data. After the process R8 is finished, the scanning main process is ended.

(Reference Data CD1 Calculation Process R1)

Figure 8:
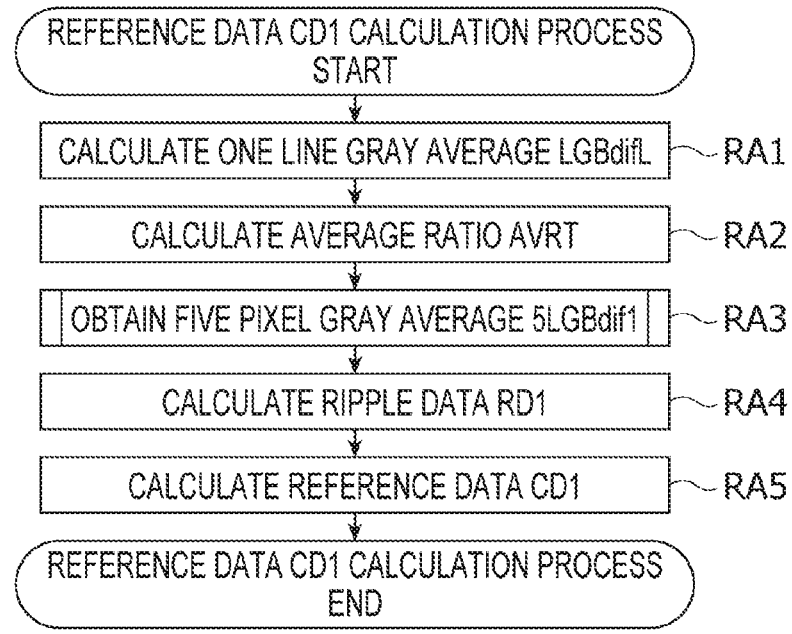
FIG. 8 is a flowchart illustrating a reference data CD1 calculation process according to the illustrative embodiment.

When the reference data CD1 calculation process (R7) shown in FIG. 8 is started, the CPU 40 calculates the one line gray average LGBdifL (RA1). Specifically, the CPU 40 averages the light gray and black difference data LGBdif of all the pixels in one line to obtain the one line gray average LGBdifL. The CPU 40 stores the calculated one line gray average LGBdifL in the flash PROM 43.

In process RA2, the CPU 40 calculates the average ratio AVRT. Specifically, the CPU 40 divides the one line white average WBdifL by the one line gray average LGBdifL to obtain the average ratio AVRT.

In process RA3, the CPU 40 obtains five pixel gray average 5LGBdif1. Details about calculation of the five pixel gray average 5LGBdif1 will be described later. Here, calculation of the five pixel gray average 5LGBdif1 is briefly explained. The CPU 40 averages, for each pixel in one line, the light gray and black difference data LGBdif of successively adjoining five pixels to obtain the five pixel gray average 5LGBdif1. The CPU 40 stores, in the flash PROM 43, the five pixel gray average 5LGBdif1 for each pixel of each color in one line.

In process RA4, the CPU 40 calculates the ripple data RD1. Specifically, the CPU 40 subtracts the five pixel gray average 5LGBdif1 from the light gray and black difference data LGBdif, and multiplies the subtraction result by the average ratio AVRT to obtain the ripple data RD1 for each pixel of each dolor in one line. In process RA5, the CPU 40 calculates the reference data CD1. Specifically, the CPU 40 adds the ripple data RD1 to the five pixel white average 5WBdif1 to calculate the reference data CD1 for each pixel of each color in one line, and stores the reference data CD1 in the RAM 42. After the process RA2 is finished, the reference data CD1 calculation process (R7) is ended.

(Five Pixel Gray Average 5LGBdif1 Obtaining Process)

Figure 9:
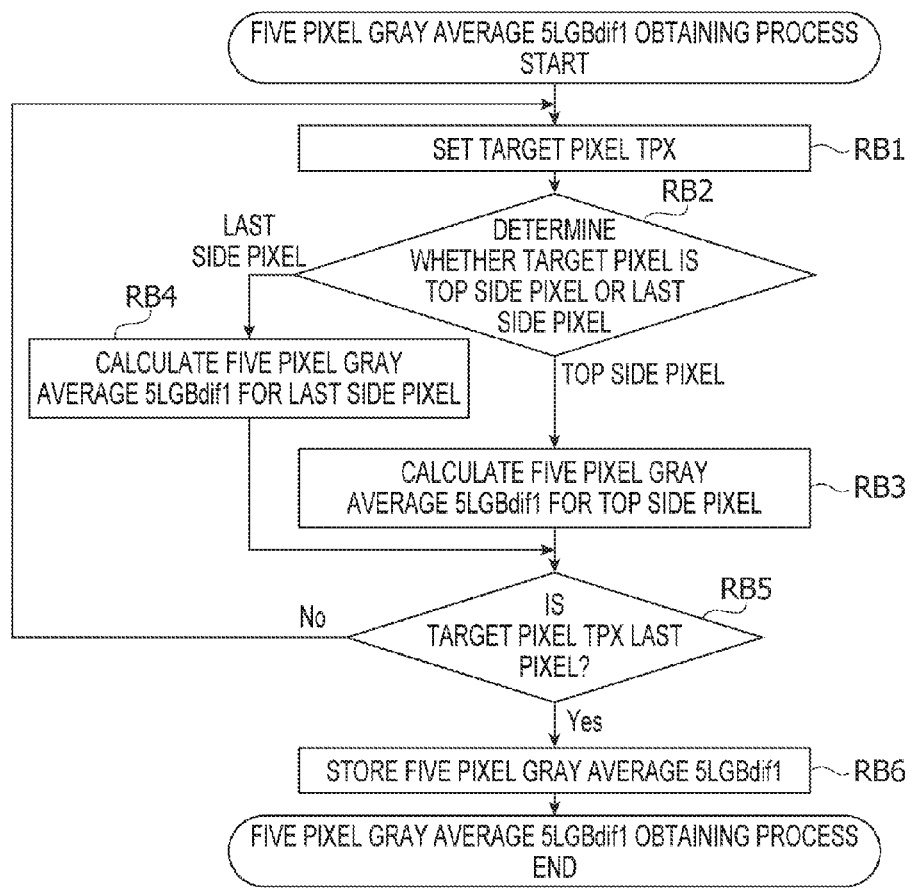
FIG. 9 is a flowchart illustrating a five pixel gray average 5LGBdif1 obtaining process according to the illustrative embodiment.

When the five pixel gray average 5LGBdif1 obtaining process (RA3) shown in FIG. 9 is started, the CPU 40 sets a target pixel TPX as in the case of the process MA1 (RB1). Specifically, when the target pixel TPX has already been set, the CPU 40 newly sets a next pixel as the target pixel TPX. On the other hand, when no target pixel TPX is set, the CPU 40 sets the top pixel as the target pixel TPX.

As in the case of the process MA2, the CPU 40 determines whether the target pixel TPX is a top side pixel in one line or a last side pixel in one line (RB2). Specifically, the CPU 40 determines that the target pixel is a pixel on the top pixel side when the pixel number PN of the target pixel TPX is smaller than or equal to 1296 (RB2: Top Side Pixel), and then the process proceeds to process RB3. The CPU 40 determines that the target pixel TPX is a pixel on the last pixel side when the pixel number PN of the target pixel is larger than 1296 (RG2: Last Side Pixel), and then the process proceeds to process RB4.

The CPU 40 calculates the five pixel gray average 5LGBdif1 at the pixel of the top pixel side (RB3). Specifically, the CPU 40 averages the light gray and black difference dataLGBdif of five pixels in total including the light gray and black difference data LGBdif of the target pixel TPX and the light gray and black difference data LGBdif of four pixels successively adjoining the target pixel TPX toward the last pixel side, to calculate the five pixel gray average 5LGBdif1 of the target pixel TPX. After the process RB3 is finished, the process proceeds to process RB5.

The CPU 40 calculates the five pixel gray average 5LGBdif1 at the pixel of the last pixel side (RB4). Specifically, the CPU 40 averages the light gray and black difference dataLGBdif of five pixels in total including the light gray and black difference data LGBdif of the target pixel TPX and the light gray and black difference data LGBdif of four pixels successive adjoining the target pixel TPX toward the top pixel side, to calculate the five pixel gray average 5LGBdif1 of the target pixel TPX.

In process RB5, the CPU 40 determines whether the target pixel TPX is the last pixel as in the case of the process MA5. Specifically, the CPU 40 determines whether the pixel number PN of the target pixel TPX is 2592. When the pixel number PN of the target pixel TPX is not 2592, the CPU 40 determines that the target pixel TPX is not the last pixel (RB5: No), and then the process returns to process RB1. When the pixel number PN of the target pixel TPX is 2592, the CPU 40 determines that the target pixel TPX is the last pixel (RB5: Yes), and deletes the settings of the target pixel TPX. Then, the process proceeds to process RB6.

In process RB6, the CPU 40 stores the five pixel gray average 5LGBdif1. Specifically, the CPU 40 stores, in the flash PROM 43, the five pixel gray average 5LGBdif1 calculated in the processes RB3 and RB4 as the five pixel gray average 5LGBdif1 of each pixel of each color in one line. After the process RB6 is finished, the five pixel gray average 5LGBdif1 obtaining process is ended.

(Operation of 2nd Illustrative Embodiment)

Hereafter, operation of an image scanning apparatus 1 according to a 2nd illustrative embodiment is explained with reference to the accompanying drawings. In the following, explanation of the 2nd illustrative embodiment focuses on the operation different from the 1st illustrative embodiment. The operation in the 2nd illustrative embodiment different from the 1st illustrative embodiment is that the five pixel white average 5WBdif1 obtaining process (M7) in the 1st illustrative embodiment is altered to a five pixel white average 5WBdif2 obtaining process (M7), and the reference data CD1 calculation process (R7) in the 1st illustrative embodiment is altered to a reference data CD2 calculation process (R7).

(Five Pixel White Average 5WBdif2 Obtaining Process)

Figure 10:
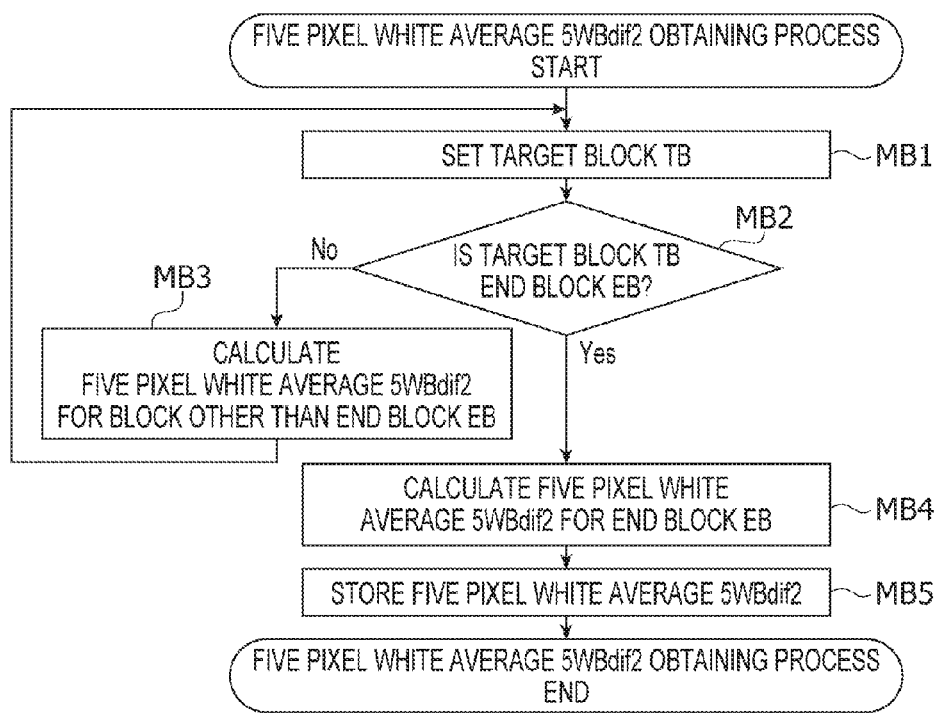
FIG. 10 is a flowchart illustrating a five pixel white average 5WBdif2 obtaining process according to the illustrative embodiment.

When the five pixel white average 5WBdif2 obtaining process (M7) shown in FIG. 10 is started, the CPU 40 sets a target block TB (MB1). Specifically, when a target block TB has already been set, the CPU 40 sets, as the target block TB, five pixels successively adjoining the set target block TB. When no target block TB has been set, the CPU 40 sets, as the target block TB, five pixels in total successively adjoining from the top pixel to the $5^{th}$ pixel. When the number of pixels from the set target block TB to the last pixel is smaller than or equal to five pixels, the CPU 40 sets, as the target block TB, five pixels successively adjoining from the last pixel to the $5^{th}$ to the last pixel. In this illustrative embodiment, when the five successively adjoining pixels from the last pixel to the 5th to the last pixel have been set as the target block TB, the target block TB is referred to as the end block EB.

In process MB2, the CPU 40 determines whether the target block TB is the end block EB. Specifically, when the last pixel is set as the target block, the CPU 40 determines that the target block TB is the end block EB (MB2: YES), and the process proceeds to the process MB4. When the last pixel is not set as the target block TB, the CPU 40 determines that the target block TB is not the end block EB (MB2: NO), and the process proceeds process MB3.

When the determination result in the process MB2 is NO, the CPU 40 calculates the five pixel white average 5Wbdif2 for a block other than the end block EB (MB3). Specifically, the CPU 40 averages the white and black difference data WBdif of five pixels set in the target block TB to calculate the five pixel white average 5WBdif2 of pixels set in the target block TB. After the process MB3 is finished, the process returns to process MB1.

When the determination result in the process MB2 is YES, the CPU 40 calculates the five pixel white average 5WBdif2 for the end block EB (MB4). Specifically, pixels set in the end block EB include pixels for which the five pixel white average 5WBdif2 has not been calculated in the process MB3. The CPU 40 calculates the five pixel white average 5WBdif2 by averaging the white and black difference data WBdif of five pixels set in the target block TB.

In the process MB5, the CPU 40 stores the five pixel white average 5WBdif2. Specifically, the CPU 40 stores, in the flash PROM 43, the five pixel white average 5Wbdif2 calculated in the processes MB3 and MB4, as the five pixel white average 5Wbdif2 for each pixel of each color in one line. The CPU 40 deletes the setting of the target block TB. After the process MB5 is finished, the five pixel white average 5WBdif2 obtaining process (M7) is ended.

(Reference DataCD2 Calculation Process)

Figure 11:
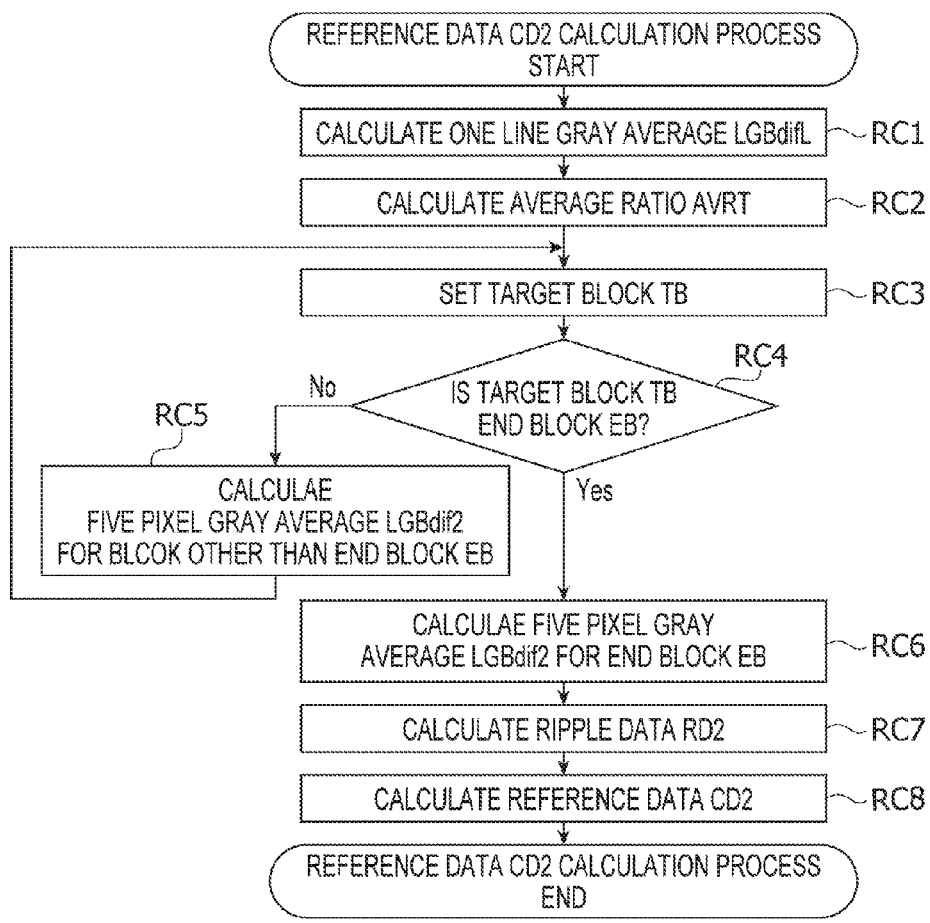
FIG. 11 is a flowchart illustrating a reference data CD2 calculation process according to the illustrative embodiment.

When the reference data CD2 calculation process shown in FIG. 11 is started, the CPU 40 calculates the one line gray average LGBdifL as in the case of the process RA1 (RC1). Specifically, the CPU 40 averages the light gray and black difference data LGBdif of all the pixels in one line to calculate the one line gray average LGBdifL and stores the one line gray average LGBdifL in the flash PROM 43.

In process RC2, the CPU 40 calculates the average ratio AVRT as in the case of the process RA2. Specifically, the CPU 40 divides the one line white average WBdifL by the one line gray average LGBdifL to calculate the average ratio AVRT.

In process RC3, the CPU 40 sets the target block TB. Specifically, when the target block TB has already been set, the CPU 40 sets next five pixels successively adjoining the set target block TB as a next target block TB. When no target block TB has been set, the CPU 40 sets, as the target block, five pixels in total successively adjoining from the top pixel to the $5^{th}$ pixel.

In process RC4, the CPU 40 determines whether the target block TB is the end block EB. Specifically, when the last pixel is set as the target block TB, the CPU 40 determines that the target block TB is the end block EB (RC4: YES), and the process proceeds to process RC6. When the last pixel is not set as the target block TB, the CPU 40 determines that the target block TB is not the end block EB (RC4: NO), and the process proceeds to process RC5.

When the determination result of the process RC4 is NO, the CPU 40 calculates the five pixel gray average 5LGBdif2 for a target block TB other than the end block EB (RC5). Specifically, the CPU 40 averages the light gray and black difference LGBdif of five pixels set as the target block TB to calculate the five pixel gray average 5LGBdif2 of the pixels set as the target block TB. After the process RC5 is finished, the process returns to the process RC3.

When the determination result of the process RC4 is YES, the CPU 40 calculates the five pixel gray average 5LGBdif2 of five pixels in the end block EB (RC6). Specifically, pixels set as the end block EB include pixels for which the five pixel gray average 5LGBdif2 has not been calculated in the process RC5. The CPU 40 averages the light gray and black difference data LGBdif of five pixels set as the target block TB to calculate the five pixel gray average 5LGBdif2 for the pixels for which the five pixel gray average 5LGBdif2 has not been calculated. Then, the CPU 40 deletes the setting of the target block TB.

In process RC7, the CPU 40 calculates the ripple data RD2. Specifically, the CPU 40 subtracts the five pixel gray average 5LGBdif2 from the light gray and black difference data LGBdif, and multiplies the calculated result by the average ratio AVRT to calculate the ripple data RD2 for each pixel of each color in one line.

In process RC8, the CPU 40 calculates the reference data CD2. Specifically, the CPU 40 adds the ripple data RD2 to the five pixel white average 5WBdif2 to calculate the reference data CD2 for each pixel of each color in one line, and stores the reference data CD2 in the RAM 42. After the process RC8 is finished, the reference data CD2 calculation process (R7) is ended.

(Advantageous Effects)

In the 1st illustrative embodiment, the white and black difference data WBdif is calculated in the process M6 of the maintenance main process. In the process MA3 and the process MA4 of the process M7 of the maintenance main process, the five pixel white average 5WBdif1 is calculated. In the process M8, the one line white average WBdifL is calculated. In the process R6 of the scanning main process, the light gray and black difference data LGBdif is calculated. In the process RA1 of the process R7 of the scanning main process, the one line gray average LGBdifL is calculated. In the process RA2, the average ratio AVRT is calculated by dividing the one line white average WBdifL by the one line gray average LGBdifL. In the process RB3 and the process RB4 of the process RA3, the five pixel gray average 5LGBdif1 is calculated. In the process RA4, the ripple data RD1 is calculated by subtracting the five pixel gray average 5LGBdif1 from the light gray and black difference data LGBdif and by multiplying the subtraction result by the average ratio AVRT. In the process RA5, the reference data CD1 is calculated by adding the ripple data RD1 to the five pixel white average 5WBdif1. In the process R8, the shading correction is performed by using the reference data CD1 as the white correction data. Therefore, even when the position shift smaller than a shift amount of one pixel occurs between the rod lens array and the photoelectric conversion elements, the reference data CD1 not affected by the position shift can be calculated because the ripple data RD1 is calculated based on the light gray and black difference data LGBdif. As a result, the precise shading correction can be performed while using the reference data CD1 as the white correction data.

In the 2nd illustrative embodiment, the white and black difference data WBdif is calculated in the process M6 of the maintenance main process. In the process MB3 and the process MB4 of the process M7 of the maintenance main process, the five pixel white average 5WBdif2 is calculated. In the process M8, the one line white average WBdifL is calculated. In the process R6 of the scanning main process, the light gray and black difference data LGBdif is calculated. In the process RC1 of the process R7 of the scanning main process, the one line gray average LGBdifL is calculated. In the process RC2, the average ratio AVRT is calculated by dividing the one line white average WBdifL by the one line gray average LGBdifL. In the process RC5 and the process RC6, the five pixel gray average 5LGBdif2 is calculated. In the process RC7, the ripple data RD2 is calculated by subtracting the five pixel gray average 5LGBdif2 from the light gray and black difference data LGBdif and by multiplying the subtraction result by the average ratio AVRT. In the process RC8, the reference data CD2 is calculated by adding the ripple data RD2 to the five pixel white average 5WBdif2. In the process R8, the shading correction is performed by using the reference data CD2 as the white correction data. Therefore, even when the position shift smaller than a shift amount of one pixel occurs between the rod lens array and the photoelectric conversion elements, the reference data CD2 not affected by the position shift can be calculated because the ripple data RD2 is calculated based on the light gray and black difference data LGBdif. As a result, the precise shading correction can be performed while using the reference data CD2 as the white correction data.

(Variations)

It is noted that the present disclosure is not limited to the above described illustrative embodiment, and the above described illustrative embodiment can be varied in various ways within the scope of the present disclosure as follows.

(1) The image scanning apparatus 1 may be applied to a multifunction apparatus including a printer. In the above described illustrative embodiment, the image scanning apparatus is configured to include one scanning device 24 and one gray reference plate 34. However, the image scanning device may be configured to include two scanning devices and two gray reference plates so as to scan both sides of an original sheet GS.

(2) In the above described illustrative embodiment, all of the maintenance main process shown in FIG. 5 and the scanning main process shown in FIG. 7 are executed by the CPU 40. However, the present disclosure is not limited to such a configuration. For example, a part of the processes M3 to M8 and the processes M11 to M12 of the maintenance main process and a part of the processes R2 to R8 of the scanning main process may be executed by the image processing unit 46, the device controller 44 or the AFE 45.

The maintenance main process may be executed by an external apparatus, such as a computer, provided separately from the image scanning apparatus 1.

(3) The image scanning apparatus may be configured to include a white reference plate in place of the gray reference plate 34. In the case where the white reference plate is used, the average ratio AVRT is 1, and it is unnecessary to calculate the average ratio AVRT. Furthermore, in the case where the white reference plate is used, the light source 32 may be turned on at the light amount ST although the light source 32 is turned on at the maximum light amount in the process R4.

(4) In the above described illustrative embodiment, the maintenance main process shown in FIG. 5 and the scanning main process shown n FIG. 7 are explained in regard to the color mode. However, these processes may be executed in the monochrome mode. In the color mode, one line is constituted by the three colors. On the other hand, in the monochrome mode, one line is constituted by one color.

(5) The image scanning apparatus according to the above described illustrative embodiment is configured such that the scanning device 24 is able to scan an original sheet in the resolution of 300 DPI. However, the scanning device may be configured to scan an original sheet at other resolutions, e.g., 600 DPI or 1200 DPI. In such a case, unevenness of collected light amount is cause by a rod lens at an interval of 10 pixels in the case of the resolution of 600 DPI, and unevenness of collected light amount is caused by a rod lens at an interval of 20 pixels in the case of the resolution of 1200 DPI.

(6) In the above described illustrative embodiment, the interval of rode lenses is 0.4 mm. However, the interval of rod lenses may be another value, e.g., 1.0 mm. In the case of the interval of rod lenses of 1.0 mm, unevenness of collected light amount is caused by a rod lens at an interval of 12 pixels.

What is claimed is:

1. An image scanning apparatus, comprising:
a scanning device configured to scan an original sheet;
a reference member disposed to face the scanning device;
a correction unit configured to execute shading correction for image data obtained by the scanning device based on correction data;
a controller; and
a storage device,
the scanning device comprising:
a light source;
a plurality of light receiving elements arranged in one line; and
a lens array having a plurality of lenses, the lens array being configured to converge light emitted by the light source onto the plurality of light receiving elements;
wherein the controller is configured to execute:
a preparation process; and
an executive process to be executed after execution of the preparation process,
wherein the preparation process comprises:
a white reference data obtaining process in which the controller obtains white reference data for each of the plurality of light receiving elements in the one line by causing the scanning device to scan a white reference original sheet; and
a white storing process in which the controller obtains white basic data by averaging, for each of the plurality of light receiving elements in the one line, the white reference data of a particular number of successively adjoining elements of the plurality of light receiving elements and stores the white basic data in the storage device,
wherein an interval spaced by the particular number of elements corresponds to an interval of the plurality of lenses of the lens array,
wherein the executive process comprises:
a reference member data obtaining process in which the controller obtains reference member data for each of the plurality of light receiving elements in the one line by causing the scanning device to scan the reference member;
a lens fluctuation calculation process in which the controller calculates, for each of the plurality of light receiving elements in the one line, fluctuation data of the correction data based on the reference member data; and
a correction data generation process in which the controller generates, for each of the plurality of light receiving elements in the one line, the correction data by adding the fluctuation data to the white basic data.

2. The image scanning apparatus according to claim 1,
wherein the preparation process further comprises a white average calculation process in which the controller calculates a white average by averaging the white reference data of all of the plurality of light receiving elements in the one line,
wherein the lens fluctuation calculation process comprises:
a reference average calculation process in which the controller calculates a reference average by averaging the reference member data of all of the plurality of light receiving elements in the one line;
a reference basic calculation process in which the controller obtains reference basic data by averaging, for each of the plurality of light receiving elements in the one line, the reference member data of the particular number of successively adjoining elements of the plurality of light receiving elements; and
a fluctuation data calculation process in which the controller obtains, for each of the plurality of light receiving elements in the one line, the fluctuation data by calculating reference fluctuation data while subtracting the reference basic data from the reference member data, by multiplying the reference fluctuation data by the white average, and by dividing a multiplication result by the reference average.

3. The image scanning apparatus according to claim 2, wherein:
the plurality of light receiving elements is an even number of light receiving elements;
in the reference basic calculation process, for each of top side light receiving elements arranged from a top pixel position to a central position in an arrangement region of the plurality of light receiving elements in the one line, the controller calculates the reference basic data by averaging the reference member data of the particular number of successively adjoining elements which successively adjoin from each of the top side light receiving elements toward a last pixel side; and
in the reference basic calculation process, for each of last side light receiving elements arranged from the central position to a last pixel position in the arrangement region of the plurality of light receiving elements in the one line, the controller calculates the reference basic data by averaging the reference member data of the particular number of successively adjoining elements which successively adjoin from each of the last side light receiving elements toward a top pixel side.

4. The image scanning apparatus according to claim 3, wherein:
in the white storing process, for each of top side light receiving elements, the controller calculates the white basic data by averaging the white reference data of the particular number of successively adjoining elements which successively adjoin from each of the top side light receiving elements toward the last pixel side; and
in the white storing process, for each of last side light receiving elements, the controller calculates the white basic data by averaging the white reference data of the particular number of successively adjoining elements which successively adjoin from each of the last side light receiving elements toward the top pixel side.

5. The image scanning apparatus according to claim 2, wherein in the reference basic calculation process, the controller divides the plurality of light receiving elements into a plurality of first groups while assigning, sequentially from a top light receiving element, the plurality of light receiving elements to the plurality of first groups in a unit of the particular number of successively adjoining elements, and averages, for each of the plurality of first groups, the reference member data of the particular number of successively adjoining elements assigned to each of the plurality of first groups so as to obtain the reference basic data.

6. The image scanning apparatus according to claim 5, wherein, regarding a particular one of the plurality of first groups including a last light receiving element, when a number of light receiving elements in the particular one of the plurality of light receiving elements is less that the particular number, the particular number of successively adjoining elements which successively adjoin from the last light receiving element toward the top light receiving element are assigned to the particular one of the plurality of first groups.

7. The image scanning apparatus according to claim 5, wherein in the white storing process, the controller divides the plurality of light receiving elements into a plurality of second groups while assigning, sequentially from a top light receiving element, the plurality of light receiving elements to the plurality of second groups in a unit of the particular number of successively adjoining elements, and averages, for each of the plurality of second groups, the whit reference data of the particular number of successively adjoining elements assigned to each of the plurality of second groups so as to obtain the white basic data.

8. The image scanning apparatus according to claim 7, wherein, regarding a particular one of the plurality of second groups including a last light receiving element, when a number of light receiving elements in the particular one of the plurality of light receiving elements is less that the particular number, the particular number of successively adjoining elements which successively adjoin from the last light receiving element toward the top light receiving element are assigned to the particular one of the plurality of second groups.

9. A method implemented in an image scanner, the image scanner comprising:
a light source;
a sensor array including a plurality of optical elements arranged in one line; and
a lens array having a plurality of lenses, each lens being configured to converge light from the light source onto a particular number of adjoining optical elements;
a reference member;
a correction circuit configured to execute shading correction using correction data, a controller; and
a storage device, wherein the method comprising:
scanning a white reference original sheet by emitting light from the light source;
receiving white reference data outputted from each optical element;
generating white basic data of each optical element by averaging the white reference data received from the particular number of adjoining optical elements;
storing the white basic data in the storage device;
scanning the reference member by emitting light from the light source;
receiving reference member data outputted from each optical element;
generating fluctuation data of each optical element according to a particular calculation based on the reference member data; and
generating the correction data of each optical element by adding the fluctuation data to the white basic data.

10. The method according to claim 9, further comprising:
generating a white average by averaging the white reference data of all optical elements,
wherein the generating fluctuation data includes:
generating a reference average by averaging the reference member data of all optical elements;
generating reference basic data of each optical element by averaging the reference member data of the particular number of adjoining optical elements; and
generating reference fluctuation data of each optical element by subtracting the reference basic data from the reference member data; and
generating the fluctuation data by multiplying the reference fluctuation data by the white average, and by dividing the multiplication result by the reference average.

11. The method according to claim 10, wherein:
the plurality of optical elements is an even number of optical elements;
for each optical element arranged between a top pixel position and a center position of the plurality of optical element, the reference basic data is generated by averaging the reference member data of the particular number of adjoining optical elements, the particular number of adjoining optical elements being successively arranged from each optical element toward a last pixel position; and
for each optical element arranged between the center position and the last pixel position of the plurality of optical elements, the reference basic data is generated by averaging the reference member data of the particular number of adjoining optical elements, the particular number of adjoining optical elements being successively arranged from each optical element toward the top pixel position.

12. The method according to claim 11 wherein:
for each optical element arranged between the top pixel position and the center position of the plurality of optical element, the white basic data is generated by averaging the white reference data of the particular number of adjoining optical elements, the particular number of adjoining optical elements being successively arranged from each optical element toward the last pixel position; and for each optical element arranged between the center position and the last pixel position of the plurality of optical elements, the white basic data is generated by averaging the white reference data of the particular number of adjoining optical elements, the particular number of adjoining optical elements being successively arranged from each optical element toward the top pixel position.

13. The method according to claim 10, further comprising:

determining a plurality of groups of the optical elements, each group including the particular number of successively adjoining optical elements, wherein the reference basic data of each optical element in each group is generated by averaging the reference member data of the particular number of successively adjoining optical elements in each group.

14. The method according to claim 13, wherein:

a particular group of the optical elements includes a number of optical elements, the particular group being one of the plurality of groups, the number being less than the particular number; and the reference basic data of each optical element in the particular group is generated by averaging the reference member data of the particular number of successively adjoining optical elements, the particular number of successively adjoining optical elements being successively arranged from a last optical element in the particular group toward a top pixel position.

15. The method according to claim 13, wherein the white basic data of each optical element in each group is generated by averaging the white reference data of the particular number of successively adjoining optical elements in each group.

16. The method according to claim 15, wherein:

a particular group of the optical elements includes a number of optical elements, the particular group being one of the plurality of groups, the number being less than the particular number; and the white basic data of each optical element in the particular group is generated by averaging the white reference data of the particular number of successively adjoining optical elements, the particular number of successively adjoining optical elements being successively arranged from a last optical element in the particular group toward a top pixel position.

* * * * *